United States Patent [19]

Carter

[11] Patent Number: 4,586,830
[45] Date of Patent: May 6, 1986

[54] COMBINATION ROTARY GAS BEARING AND SEAL APPARATUS

[75] Inventor: Donald L. Carter, Vestal, N.Y.

[73] Assignee: International Business Machines Corporation, Armonk, N.Y.

[21] Appl. No.: 600,630

[22] Filed: Apr. 16, 1984

[51] Int. Cl.$^4$ .......................... F16C 32/06; F16J 15/40
[52] U.S. Cl. .................................. 384/121; 384/124; 384/134; 277/3
[58] Field of Search .............. 277/3, 27; 384/99, 100, 384/107–109, 121, 124, 132, 134

[56] References Cited

U.S. PATENT DOCUMENTS

| | | | |
|---|---|---|---|
| 2,695,198 | 11/1954 | Brugger | 384/109 |
| 2,814,512 | 11/1957 | Quinn et al. | 286/9 |
| 3,733,490 | 5/1973 | Roche | 250/84.5 |
| 4,071,253 | 1/1978 | Heinen et al. | 277/3 |
| 4,118,042 | 10/1978 | Booth | 277/226 |
| 4,191,385 | 5/1980 | Fox | 277/3 |
| 4,205,711 | 6/1980 | Lullini et al. | 141/183 |
| 4,361,332 | 11/1982 | Logan et al. | 277/3 |

Primary Examiner—Stuart S. Levy
Assistant Examiner—David Werner
Attorney, Agent, or Firm—Norman R. Bardales

[57] ABSTRACT

Rotary gas bearing and seal apparatus is disclosed which seals a region between the two planar bearing surfaces that is radially offset from the axis of rotation of the bearing. In the preferred embodiment, two arcuate gas sink channels sink the gas of the bearing away from the region. The gas outside the region and the two channels coact to effect the seal. A gas bearing and vacuum seal embodiment using air or alternatively nitrogen as the bearing gas is described.

16 Claims, 4 Drawing Figures

COMBINATION ROTARY GAS BEARING AND SEAL APPARATUS

CROSS REFERENCE TO RELATED APPLICATIONS

In copending patent application, Ser. No. 600,629, concurrently filed herewith, and entitled "Vacuum-to-Vacuum Entry System Apparatus", D. L. Carter, inventor herein, and assigned to the common assignee herein, there is described apparatus utilizing the combination rotary gas bearing and seal apparatus of the present invention. The aforementioned copending application is incorporated herein by reference.

BACKGROUND OF THE INVENTION

1. Field of the Invention

This invention relates to combination gas bearing and seal apparatus and more particularly to such combination type apparatus of the rotary type.

2. Description of the Prior Art

Combination rotary gas bearing and sealing devices are well known in the art, cf. for example, U.S. Pat. Nos. 2,814,512, 3,733,490, 4,118,042, 4,191,385, and 4,361,332, to name just a few. In general, in such devices the gas of the bearing is used to effect the seal. However, heretofore in the prior art of which I am aware, the seal could only seal off a region of the bearing which encompassed the axis of rotation of the bearing, the seal and region being generally concentric with the axis. Thus, the prior art devices were not amenable to system apparatus in which there is a need to provide a seal for a region between two planar gas bearing surfaces of the bearing that is offset from the axis of rotation, i.e. a region which is radially offset from and doesn't include the axis of rotation, such as, for example, as is required in the entry system apparatus of my aforementioned copending application. Hence, the prior art devices were not amenable to providing a seal for a low pressure region, e.g. a vacuumized opening, in a rotary gas bearing using air or the like where the region has to be radially offset from and not encompass the bearing's axis of rotation.

In the automatic filling machine of U.S. Pat. No. 4,205,711, which is used for the dosing of powder from a hopper through an intermediate sector body to a rotatable dosing head, compressed air is used in the spacing between the concentric curved surfaces of the dosing drum head and the sector body to provide a hermetic seal for the opening of the body and the underlying powder carrying chambers of the rotating drum head. The hermetic seal provided by the compressed air is only operative when the head is rotating, and, moreover, only during the rotation is the hermetic seal intended to prevent the powder from the opening of the body from entering the opening of the carrying chamber. During the rotational movement periods of the drum head, the sector body is in a retracted outward radial position with respect to the rotating head and is maintained at a spacing with respect to the head by a set of locator pins. During the periods of non-rotation of the head, the sector body is in an extended radially inward position that places the body in contact with the head via another set of locator pins. The compressed air is and must not be present during these last mentioned periods so as to allow the transfer, which is in the radial direction, of the powder from the opening of the body to the aligned opening of one of the plural powder carrying chambers by suction means, which gas if otherwise present would prevent the transfer as explained previously. Thus, even though the compressed gas may also provide some lubrication between the moving parts, it is and can only be present during the actual rotation periods. Because of the intermittent presence of the gas and/or because of the requirement of curved surfaces for the sealing and/or lubrication operation, this prior art system is only useful for passing the powder through the aligned openings in a radial direction. In addition, the spacing between the two surfaces are maintained exclusively by independent mechanical means. Due to variations in the concentricity of the respective surfaces such as, for example, misalignment with respect to the axis of rotation, the seal is subject to leakage. Thus, this prior art system is not very reliable and/or has poor throughput rates. Moreover, it is particularly not conducive for vacuum to vacuum entry systems and/or particularly for vacuum to vacuum entry systems of the rotary type in which the article passes through in a direction parallel to the axis and/or where the seal is required to be present as the transferring of the article from one vacuum to the other vacuum is taking place.

SUMMARY OF THE INVENTION

It is an object of this invention to provide rotary gas bearing and seal apparatus that seals off a region of the bearing that is radially offset from the bearing's axis of rotation and doesn't include the axis of rotation.

It is another object of this invention to provide rotary gas bearing and seal apparatus that seals off a low pressure region which is offset from and non-encompassing with the bearing's axis of rotation.

It is still another object of this invention to provide rotary gas bearing and seal apparatus that seals off at least one vacuumized opening in the bearing, the last mentioned opening(s) being offset from and non-encompassing with the bearing's axis of rotation.

According to one aspect of the present invention, there is provided gas bearing and seal apparatus which has first and second members that have first and second planar gas bearing surfaces, respectively. The gas bearing surfaces are in parallel facing relationship with each other, and are relatively rotatable with respect to each other about an axis that is normal to the gas bearing surfaces. The first surface has a predetermined region that is offset a predetermined radial distance from the axis and which is not intersected by the axis. Gas supply means provide a gas between the first and second surfaces to support axially the first and second members with a predetermined spacing between the two surfaces. Gas sink means are provided within a predetermined sector of the first surface relative to the axis, the aforementioned region being disposed within the sector. The gas is sinked away from the region by the gas sink means. The gas between the first and second surfaces and the gas sink means coact to provide a seal for the region.

According to another aspect, the last mentioned gas sink means has at least two gas sink parallel arcuate channels which are concentric with the axis and disposed within the sector of the first surface, and the region is disposed between the two channels.

The foregoing and other objects, features and advantages of the invention will be apparent from the more particular description of the preferred embodiment of the invention, as illustrated in the accompanying drawing.

BRIEF DESCRIPTION OF THE DRAWING

In the figures, like elements are designated with similar reference numbers.

DESCRIPTION OF THE PREFERRED EMBODIMENT

For sake of explanation and/or simplicity, in the figures of the present application and of my aforementioned copending application, like elements are designated with similar reference numbers.

Figure 1:
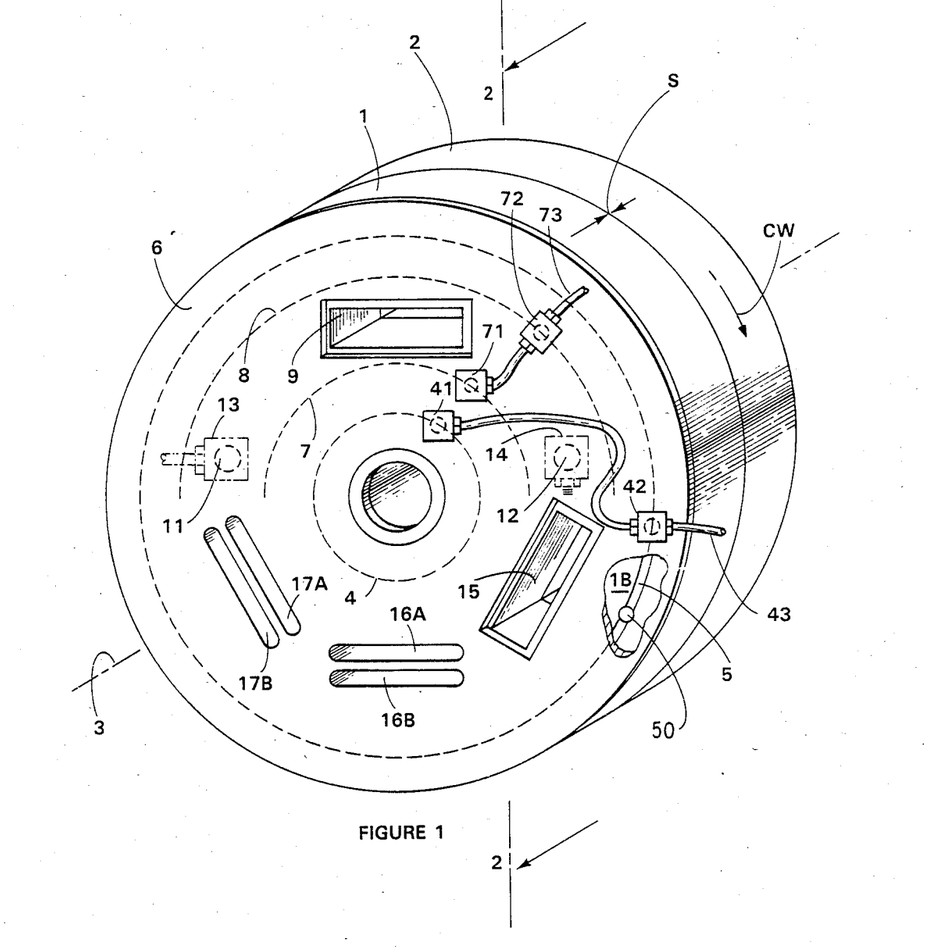
FIG. 1 is a perspective view of an assembly of the preferred embodiment of the rotary gas bearing and seal apparatus of the present invention.
Figure 2:
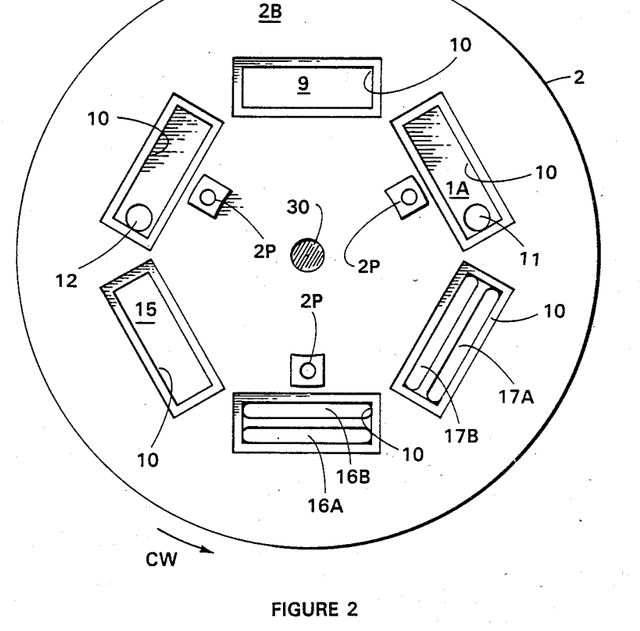
FIG. 2 is a plan view of the remote side of the assembly of FIG. 1 as viewed along the line 2—2 thereof.
Figure 3:
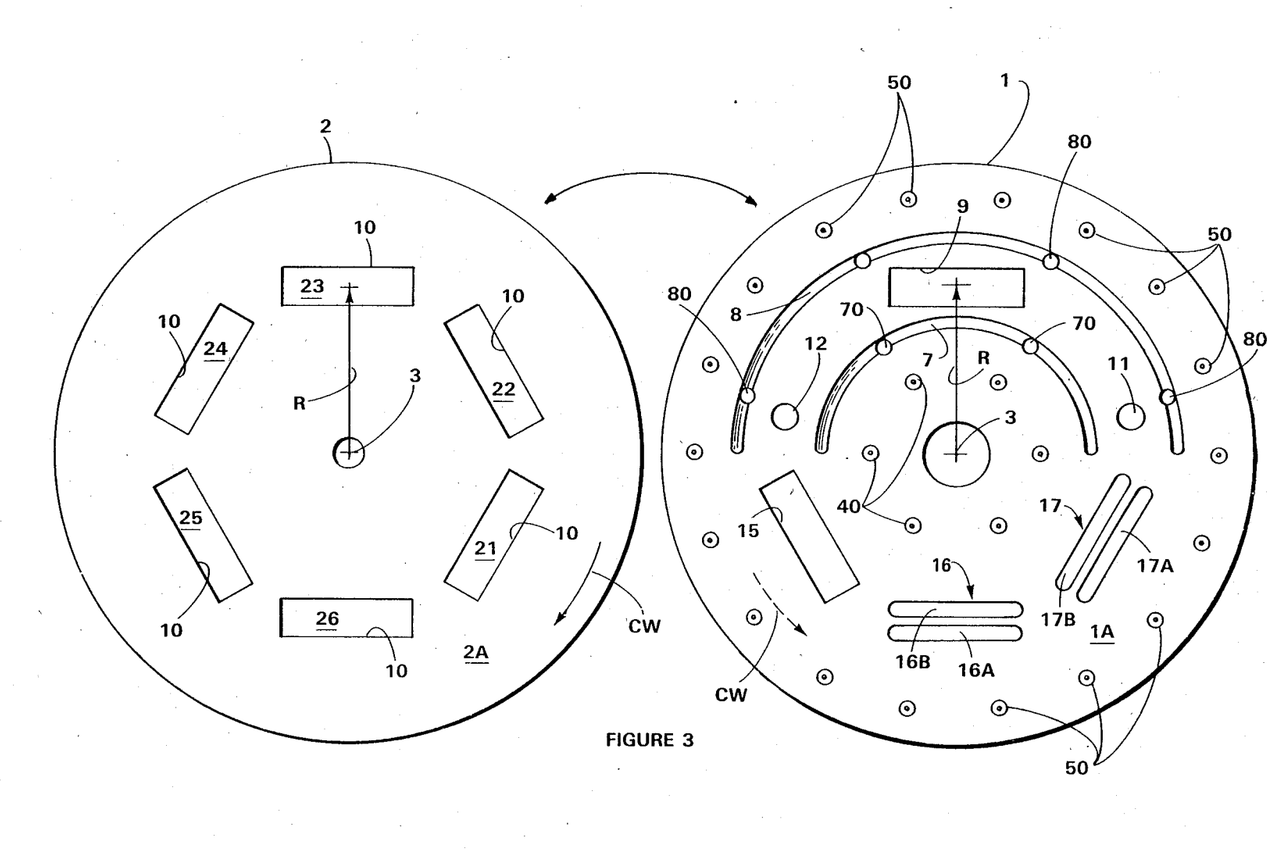
FIG. 3 is an exploded view of the assembly of FIG. 1 illustrating the respective opposing bearing surfaces of the apparatus thereof.

Referring to FIGS. 1-3, in the preferred embodiment of the gas bearing and seal apparatus of the present invention, there are two members 1 and 2 with respective planar gas bearing surfaces 1A and 2A, cf. FIG. 3. The gas bearing surfaces 1A and 2A are in parallel facing relationship in the assembly of FIG. 1. The two surfaces 1A and 2A are relatively rotatable about an axis 3 that is normal to the surfaces 1A and 2A. Preferably, the member 1 is stationary and the member 2 is incrementably rotatable about axis 3 in a manner well known to those skilled in the art. In the preferred embodiment, the apparatus is symmetrically configured. Accordingly, members 1 and 2 preferably have compatible cylindrical shapes, e.g. disc shapes, and are concentrically aligned with the axis 3. Hence, surfaces 1A and 2A are circular. However, it should be understood that the view of FIG. 1 is exaggerated to illustrate the circularity of the planar surfaces of the disc shaped members 1 and 2 for sake of clarity.

The gas for the bearing is supplied by gas supply means which in the preferred embodiment includes two concentric circular channels 4 and 5 formed in another surface 1B, which is partially shown in FIG. 1, of member 1, and the two series of plural holes 40 and 50. In the preferred embodiment, the series of holes 40 are radially and angularly symmetrically disposed in an inner circle that is in circumferential alignment and registration with the circular channel 4, and similarly the series of holes 50 are radially and angularly symmetrically disposed in an outer circle that is in circumferential alignment and registration with the circular channel 5. Holes 40 and 50 intersect channels 4 and 5, respectively, and extend through to the surface 1A. By way of example, the number of holes in the two series of holes 40 and 50 are six and eighteen, respectively, as shown in FIG. 3. The member 1 also includes a cover 6 which is mounted via suitable means, e.g. screws, not shown for sake of clarity, to the surface 1B and sealed thereto by a gasket, not shown, or the like. Affixed to the cover 6 and in respective alignment with the channels 4 and 5 are two interconnected appropriate valve connections or fittings 41 and 42 which together with the partially shown flexible tubing 43 and a connected-thereto appropriate gas supply, not shown for sake of clarity, are part of the aforementioned gas supply means. The channels 4 and 5, as a result of being enclosed by cover 6 provide respective intake manifold connections for the gas from fittings 41 and 42, respectively, to the respective holes 40 and 50. The gas upon exiting from the holes 40 and 50 at the surface 1A reacts with the surfaces 1A and 2A in a thrust bearing manner that axially supports the members 1 and 2, and thereby providing and/or maintaining a predetermined small size gap or spacing S between the surfaces 1A and 2A both for the static and dynamic operational modes of the members 1 and 2.

In accordance with the principles of the present invention, in a given sector of the surface 1A relative to the axis 3, there is a region which is offset radially from and is not intersected by the axis 3 and which is desired to be sealed off. The offset region, as described in greater detail hereinafter, is sealed by coaction of the gas between the two surfaces 1A and 2A and gas sink means next to be described. More particularly, the gas sink means is disposed within the aforementioned sector to sink away the gas from the region whilst the remaining gas within the sector seals off the region as will be described next in connection with the gas sink means of the preferred embodiment.

The gas sink means preferably has two gas sink parallel arcuate channels 7 and 8, cf. FIG. 3, which are preferably disposed in the gas bearing surface 1A of member 1 in a concentric manner about the axis 3 and hence are also concentric with the circularly disposed holes 40 and 50 and their associated circular channels 4 and 5 on surface 1B. Channels 7 and 8 lie in a predetermined sector of surface 1A. In the preferred embodiment, the sector has 180 degrees and corresponds to the upper half of the surface 1A as viewed facing FIG. 3. The arcuate channels 7 and 8 are disposed on surface 1A at respective radial distances which are between those of the inner and outer circular channels 4 and 5 on surface 1B, and the channels 7 and 8 extend the arc length of the given sector, which in the preferred embodiment is 180 degrees, as aforementioned. Each of the channels 7 and 8 is intersected by a series of plural holes, i.e. holes 70 and 80, respectively. By way of example, the number of holes 70 and 80 are two and four, respectively, as shown in FIG. 3. In the preferred embodiment, the holes 70 are symmetrically disposed on the arc of the channel 7, and likewise the holes 80 are symmetrically disposed on the arc of the channel 8.

The two series of holes 70 and 80 extend from the gas bearing surface 1A through to the opposite surface 1B of member 1 and each intersects a respective one of two arcuate channels, not shown for sake of clarity, disposed on surface 1B that are concentric with axis 3 and in corresponding alignment and registration with the respective channels 7 and 8 that are on the gas bearing surface 1A. The two aforementioned arcuate channels of surface 1B are connected, in turn, by respective ones of two interconnected fittings 71, 72 mounted on cover 6. Fittings 71 and 72 in turn are connected via flexible tubing 73 to a roughing pump, also not shown for sake of clarity, in a manner well known to those skilled in the art. The aforementioned two arcuate channels, not shown, of surface 1B, fittings 71, 72, tubing 73, and roughing pump, not shown, are part of the gas sink means.

The last mentioned two arcuate channels of surface 1B as a result of being enclosed by cover 6 provide exhaust manifold connections for the gas being sinked through the arcuate channels 7 and 8 of surface 1A and into the respective holes 70 and 80, these two arcuate channels of surface 1B then passing the gas onto the last mentioned roughing pump via the associated fittings 71, 72 and tubing 73 in a manner well known to those skilled in the art. As a result, in the region of surface 1A that is between the channels 7 and 8 in the aforementioned upper half circle sector of the surface 1A as viewed facing FIG. 3 and which is at a mean radial distance R from axis 3, the gas is sinked away from the region by the gas sink means through its channels 7 and 8, and the region is effectively sealed off by the coaction of the gas outside the region and the gas sink means.

In operation, the gas which exits from the holes 40 and 50 cause a thrust bearing like reaction between the surfaces 1A and 2A which keeps them separated by a small size gap or spacing S. Moreover, a zone is established as a portion of the gap S, which zone is substantially adjacent to and conformal with the region on surface 1A between the gas sink channels 7 and 8. The zone extends through the gap S from surface 1A to the surface 2A. The gas is prevented from entering the zone due to the coaction of the gas sink channels 7 and 8 and the small size of the spacing S. Thus, the aforementioned portion or zone of the gap S, which zone also is radially offset from and is not intersected or include the axis 3, is effectively surrounded or encompassed by the remaining gas in the gap S and thereby is provided with a peripheral seal around the zone with the gas which is outside the aforesaid zone. Moreover, the seal is present for both the static and dynamic operational conditions or modes of the members 1 and 2, that is to say, when the member 2 is not and is, respectively, rotating relative to member 1 about axis 3.

The aforementioned region in the preferred embodiment is preferably provided with a vacuumized opening 9. The vacuumized opening 9, which extends through member 1 from surface 1A to surface 1B and through its cover 6, is preferably symmetrically located in the region. At the cover 6, the opening 9 is adapted to be connected, in a manner well known to those skilled in the art, to a vacuumized environment, not shown, through an appropriate seal connection, such as the hollow bellows-like connection 90 shown in FIG. 4. The environment, as well as the last mentioned connection, is not considered part of the present invention per se, and may be, for example, a staging vacuum chamber, not shown, such as the one of the vacuum-to-vacuum entry system apparatus described in my aforementioned copending application. The chamber has an opening which corresponds to and is conformal with the opening 9 and which is in sealed abutment with the opening 9 to which it is mated and connected through the fitting 90. As such, the vacuumized opening 9, and hence the vacuum chamber connected thereto, is sealed off in the spacing S by virtue of the location of opening 9 in the aforedescribed region between the two channels 7 and 8.

Moreover, in the preferred embodiment, the other member 2 is also preferably provided with at least one or more openings 10 that extend through member 2 from its surface 2A to its other surface 2B. Thus, as shown in FIG. 3, member 2 has six preferably identical openings 10, which are angularly and radially disposed in a symmetrical manner in a circle that is concentric with axis 3. These openings 10 have substantially identical configurations as opening 9 of member 1. The respective centers of opening 9 and each opening 10 are located substantially at the same radial distance R from axis 3. Consequently, as each opening 10 is brought into alignment with the opening 9, as the surface 2A is incrementally rotated about axis 3, it is placed in communication with the opening 9 through the aforedescribed sealed zone in the gap S. Moreover, in the particular embodiment, as a result of an opening 10 being moved into a position where it is aligned with the upper half sector of surface 1A, it is in substantially facing relationship with the sealed off aforementioned region between the two arcuate channels 7 and 8. As such, the coaction of the gas in the spacing S between the surfaces 1A and 2A and of the the gas sink means associated with the gas sink manifold channels 7 and 8 provide a peripheral seal around the region and aforedescribed zone and thus likewise seals the particular opening 10 of member 2, as well as the opening 9 of member 1. Hence, as the two openings 9 and 10 are placed in communication with each other through the aforementioned zone of the gap S as they move into and out of overlapping and concentric alignments, and the gas outside the aforedescribed zone thereby provides a peripheral seal for the intercommunicating openings 9 and 10 when so aligned.

Figure 4:
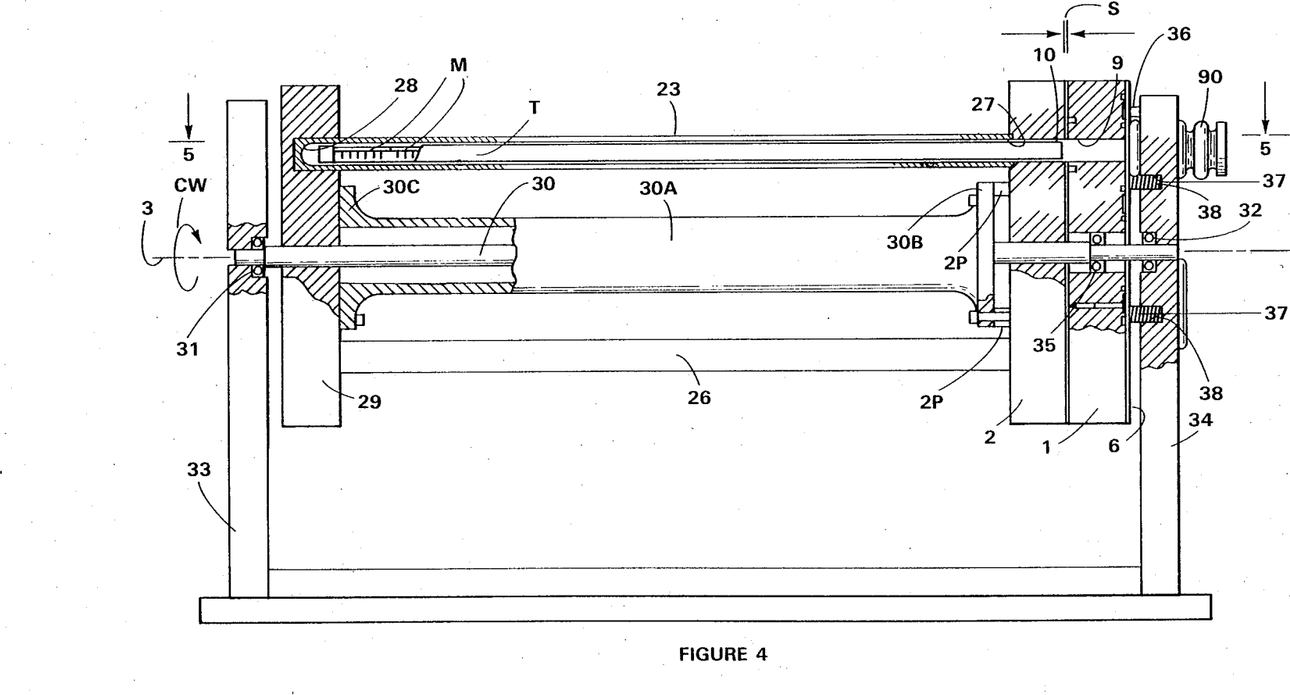
FIG. 4 is a schematic partial side view of the vacuum-to-vacuum entry system apparatus described in my aforementioned copending application illustrating for sake of explanation the rotary gas bearing and seal apparatus of the present invention as it is utilized therein.

Referring now to FIG. 4, the preferred embodiment of the rotary gas bearing and seal apparatus of the the present invention will next be described for purposes of explanation in relation to its application to the vacuum entry system apparatus of my aforementioned copending application. The openings 10 are adapted to be connected to individual environments, which in the aforementioned system apparatus are individual carrier or loading chambers. Hence, for the particular number of openings 10, to wit: six, it should be understood that there are a corresponding number, i.e six, of identical loading chambers which for sake of clarity are numbered in counterclockwise direction as seen through the openings 10 from the surface 2A, i.e. facing FIG. 3, by the reference numbers 21–26. For sake of clarity only two chambers 23 and 26 are shown in FIG. 4. Each chamber 21–26 is an elongated hollow member with a rectangular cross section. One end 27 of the chamber is open ended and has thereat a compatible opening which is in sealed abutment-with and mated-to one of the openings 10 at the surface 2B of member 2 to which the end 27 of the particular chamber is also supportably mounted. The six chambers are mounted in a cylindrical shaped assembly 20 in a squirrel cage like manner. More particularly, the chambers 21–26 are supported at their opposite closed ends 28 in a circumferential manner to a disc shaped member 29.

Members 2 and 29 are affixed to a rotatable shaft 30 which is coincident with axis 3 and is also not encompassed by the sealed-off aforementioned offset zone and region between channels 7 and 8. Shaft 30 is journaled by mechanical bearings 31 and 32 in two support frame members 33 and 34, respectively.

In the preferred embodiment of the present invention, member 1 is also preferably supported on shaft 30 by a mechanical bearing 35. Shaft 30 is free to rotate in the bearing 35, the member 1 being prevented from rotating on the shaft 30 by an appropriate pin stop 36 which is affixed to frame member 34 and extends outwardly therefrom towards member 1 and received in a sealed opening, not shown, thereof that extends through cover 6 and inwardly from the surface 1B partially into member 1. The member 1 is urged towards member 2 by plural, e.g. six, springs 37 which are radially and angularly symmetrically disposed with respect to axis 3 and are mounted in openings 38 in member 34 and extend outwardly therefrom with their free ends contacting the outer surface of cover 6. For sake of clarity, only two of the springs 37 and their associated openings 38 are shown in FIG. 4.

Preferably, the surfaces 1A and 2A are high precision polished, i.e. lapped, surfaces. The springs 37 bias the surfaces 1A and 2A in their respective parallel relationship. However, any slight deviation from this relationship is compensated by the resulting reaction of the gas of the gas bearing on the surface 1A which overcomes the spring bias of the appropriate one or ones of the springs 37 and allows the member 1 to pivot slightly on the bearing 35 in a direction which substantially returns the surfaces 1A and 2A to their desired parallel orientation. A slight clearance is provided in the aforementioned opening, not shown, of member 1 which receives stop 36 to allow the slight pivot motion of member 1 on bearing 35. It should be noted that the bellows action of the connection 90 between the member 1 and the relatively fixed aforementioned stagging chamber, not shown, allows the slight axial and pivotable motion of member 1 on shaft 30 to take place.

Shaft 30 is driven in an intermittent manner by an incrementable driver system, not shown, such as, for example, a rotary stepper motor driver system or the like. Thus, as the shaft 30 is incremented, it rotatably increments the member 2 and hence the surface 2A relative to the stationary surface 1A about axis 3. In the preferred embodiment, the shaft 30 and hence member 2 and its surface 2A are incremented in six equal radial positions corresponding to and in alignment with the six work stations, hereinafter described, which are associated with the assembly 20.

It should be understood, for the periods during which the member 2 is being rotated, the apparatus is in its dynamic operational mode; and for the periods during which the member 2 is stationary, the apparatus is in its static mode. In either case, the gas is present in the gap S and is providing the bearing and seal function as previously explained. In the preferred embodiment of the present invention, air or alternatively nitrogen is preferably used as the gas for the bearing. A hollow rigid shaft 30A which is concentric with shaft 30 provides additional support for the assembly 20. Shaft 30A has a flanged end 30B which is affixed to the mounting pedestals 2P integrally formed on the surface 2B of member 2. The other flanged end 30C is affixed to member 29.

For the particular vacuum-to-vacuum entry system apparatus described in my aforementioned copending application, the member 1 is also provided with two circular openings 11 and 12 in the sealed region between channels 7 and 8 on opposite sides of opening 9 as viewed facing FIG. 3. Openings 11 and 12 extend from surface 1A through to surface 1B and through cover 6 where they are connected to fittings 13 and 14, respectively, shown in outline form in FIG. 1 for sake of clarity. Fitting 13 is connected through flexible tubing to a roughing pump system, not shown. Fitting 14, on the other hand, is connected through another flexible tube to a gas supply system, which is also air or alternatively nitrogen as the case may be in the preferred embodiment. The aforementioned peripheral seal around the aforementioned sealed region and adjacent zone in the gap S also provides a peripheral seal for the openings 11 and 12.

In addition, member 1 in its lower half sector of surface 1A as viewed facing FIG. 3 has an opening 15 with a cross sectional configuration compatible with those of openings 9 and 10, which in the preferred embodiment is rectangular. Opening 15 extends through member 1 and its cover 6. Opening 15 provides access to the chambers 21–26, as hereinafter explained. Also provided in the member 1 are two sets, designated generally by the reference numbers 16 and 17, of paired parallel aligned slitlike openings 16A–16B and 17A–17B, respectively, which also extend through member 1 and cover 6. Sets 16 and 17 are associated with the cleaning and drying preparatory processes, respectively, used prior to testing and are hereinafter described. It should be understood that the member 34 is provided with appropriately aligned conformal openings to provide extension and passage therethrough and/or access thereto of the fittings associated-with and/or the various openings 9, 11, 12, 15, 16, 17 and aforementioned manifolds of openings 40, 50, 70 and 80. Openings 15, 16, 17, 11 and 9 and 12 of member 1, and in the particular sequence as just mentioned, correspond to the six workstations associated with the assembly 20 to which each opening 10 of member 2 is sequentially incremented as is explained in greater detail hereinafter.

The system apparatus shown in FIG. 4 acts as a rotary transport and is used to load ceramic substrates having high density circuit line surfaces into the vacuum chamber of an electron beam open and short circuit tester, whose principle of operation is well known to those skilled in the art. Briefly, by way of explanation, the electron beam under controlled and known operating parameters is addressed to and charges the adjacent circuit line(s) of a circuit line under test. By observing and/or comparing the results with predetermined expected conditions for the given parameters, a determination can be made if the line under test is good or if it is defective vis-a-vis a short circuit condition. To test for an open circuit condition, the electron beam, again under controlled and known operating parameters, is addressed to one end of the circuit line under test and charges the particular line addressed. By observing and/or comparing the results at another end of the particular line under test with predetermined expected conditions for the given parameters, a determination can be made if the line under test is good or if it is defective because of an open circuit condition.

In operation, as described in my aforementioned application, the member 2 is incrementally rotated during a dynamic operational mode interval which rotates surface 2A in the clockwise direction as viewed facing FIG. 3 and designated by the arrow CW in the drawing, so that an opening 10 thereof is placed in alignment with the opening 15 of member 1 at which point the motion is stopped thereby commencing a static operational mode interval. As a result, one of the empty chambers 21–26, which for purposes of explanation is assumed to be chamber 21, is placed in alignment with the opening 15 of member 1. As such, chamber 21 during this static operational mode interval is in operative position with the first work station of the assembly 20 associated with the opening 15 which is at normal atmospheric pressure (760 Torr). Next, an open cartridge or tray T carrying a row of aligned and abutting planar high density circuitized ceramic substrates M, which may be pinned or not pinned, with their circuitized surfaces coplanarly aligned in the tray T and facing outwardly with respect to the cylinder assembly 20 is fed into chamber 21 through opening 15 and the aligned opening 10 of chamber 21. It should be understood and noted that under these conditions the other chambers 22 to 26 are concurrently in operative positions with the sixth, fifth, fourth, third and second work stations, respectively, of assembly 20 which are associated with the openings 12, 9, 11, 17A-17B and 16A-16B, respectively. Thereafter, after each incremental rotation, each of the chambers 21 to 26 is operatively positioned with the next work station of the sequence.

More particularly, by way of explanation and for sake of clarity, during a static operational mode interval, each of the six openings 10 of member 2 are aligned with respect to one of the openings 9, 11, 12, 15, 16A-16B and 17A-17B of member 1 as shown in FIG. 2 as viewed facing surface 2B. Thus, each of the chambers 21 to 26 associated with one of the openings 10 is in a concurrent operative position with one of the six work stations associated with the openings 9, 11, 12, 15, 16A-16B, and 17A-17B. It should be understood that the static and dynamic operational modes occur in alternate time intervals, and that each dynamic operational mode interval concurrently advances, i.e rotates, each of the chambers 21-26 to the next workstation of the sequence.

Accordingly, for the given assumption, the next clockwise incremental rotation, places chamber 21 in alignment with the set 16 of openings 16A and 16B, and the next chamber 22 in alignment with opening 15. Chamber 21 is now in operative position with the second work station of assembly 20. Through an appropriate sealed fitting, not shown, a cleaning fluid is injected through opening 16A across the gap S into the aligned opening 10 associated with chamber 21. From there, the fluid flows across the circuitized surfaces of the substrates M. It should be understood that the tray T when loaded in the chamber 21 positions the row of abutted modules M carried thereby so that their respective abutted coplanar circuitized surfaces are in an alignment with the slit 16A that allows the fluid to be injected across the coplanar circuitized surfaces. The curved inner surface of end 28 reverses the flow direction of the cleaning fluid and returns it along the opposite surfaces, which are also coplanarly aligned and in abutment, of the substrates M back towards the opening 10, from where it passes through the gap S and into slit 16B and from there it is exhausted through an appropriate sealed fitting, not shown, connected to the other end of slit 16B. Again, it should be understood that the tray when loaded in the chamber 21 positions the row of abutted modules M carried thereby so that their respective abutted coplanar last mentioned opposite surfaces are in an alignment with the slit 16B that allows the fluid to be returned therealong and exhausted at slit 16B. Moreover, as a result of the abutting coplanar circuitized and/or abutting coplanar opposite surfaces of the modules M, the row of abutting modules M act as a baffle for the cleaning fluid as it flows first from end 27 to the end 28 of the chamber 21 and then is returned back to the end 27, as previously described. Concurrently, another tray of substrates is loaded through opening 15 into the next chamber 22.

As a result of the next incremental rotation of member 2, chamber 21 is placed in alignment with the set 17 of openings 17A and 17B of the third work station, chamber 22 is placed in alignment with the set 16 of openings 16A and 16B of the second work station, and the next chamber 23 is placed in alignment with the opening 15 of the first work station. A drying gas is injected through an appropriate sealed fitting, not shown, connected to opening 17A across the gap S into the aligned opening 10, and from there into the open end 27 of chamber 21 where the gas then flows across the circuitized surfaces of the substrates M, which surfaces are also in alignment with the slit 17A for the reasons previously explained with respect to their alignment with slit 16A. The drying gas flows from end 27 to the curved end 28 of chamber 21 whereupon it reverses its flow direction and returns along the opposite surfaces of the substrates M back to end 27 and opening 10, from where it passes through the gap S into slit 17B and from there it is exhausted through an appropriate fitting, not shown, connected to slit 17B, the last mentioned surfaces being in alignment with slit 17B, which last mentioned surfaces are also in alignment with the slit 17B for the reasons previously explained with respect to their alignment with slit 16B. Moreover, as a result of the abutting coplanar circuitized and/or abutting coplanar opposite surfaces of the modules M, the row of abutting modules M also act as a baffle for the drying gas as it it flows first from end 27 to the end 28 of the chamber 21 and then is returned back to the end 27 as previously described. Concurrently, the tray of substrates in chamber 22 which is aligned with the set 16 of openings 16A-16B of the second work station is cleaned with the cleaning fluid, and another tray of substrates is loaded through opening 15 of the first work station into the next chamber 23.

On the next incremental rotation of member 2, chamber 21 is placed in the aforedescribed region between channels 7 and 8 which is sealed off by the bearing gas, which as aforementioned is air or alternatively nitrogen as the case may be in the preferred embodiment, of the aforedescribed gas bearing. As a result, chamber 21 is now in operative position with the fourth work station associated with opening 11. The aforementioned roughing pump, not shown, associated with fitting 13 and opening 11 evacuates the chamber 21 to a reduced intermediate pressure which is between atmospheric and the pressure at the next succeeding station whilst concurrently purging the chamber 21 from any residual gases or solvent that may be present in the chamber 21 as a result of the processes associated with the second and third work stations. Concurrently, chambers 22-24 are in operative positions with the third, second and first work stations, respectively, and are undergoing the particular operations associated thereat as was previously described with respect to chamber 21.

When member 2 is next incrementally rotated, chamber 21 as a result is operatively positioned with the fifth work station, which is associated with opening 9 as aforementioned. The loaded tray T of substrates M is then removed from chamber 21 by automatic extraction means, not shown, which passes the loaded tray T through the aligned opening 10 and 9 and bellows fitting 90 and into the aforementioned vacuumized staging chamber, not shown, from where it is progressively moved into the vacuum chamber of the electron beam tester, not shown, for testing and thereafter subsequently removed by another cylinder assembly, not shown, which has a similar configuration to the one of assembly 20 but which does not require and hence does not have the cleaning and drying work stations and the associated openings 16A-16B and 17A-17B, respectively, of the assembly 20. Concurrently, chambers 22-25, which are in operative positions with the fourth, third, second and first work stations, respectively, and are undergoing the particular operations associated thereat as was previously described with respect to chamber 21.

After the next incremental rotation of the member 2 takes place, chamber 21, which is now empty, is in operative position with the sixth work station associated with the opening 12. At this station, the aforementioned gas pump, not shown, which is associated with the opening 12, introduces into the chamber 21 a gas, which is preferably air or nitrogen as the case might be, at an intermediate pressure that is between atmospheric pressure and the pressure at the preceding, i.e. fifth, station. Preferably, the pressure of the gas at the sixth station matches and/or is substantially the same as that of the aforementioned reduced pressure associated with the fourth work station. As such, the fourth and sixth work stations act as buffer stages between the fifth station and the atmospheric pressure associated with the other work stations thereby further mitigating leakage in the seal. Concurrently, chambers 22-26 are now in operative positions with the fifth, fourth, third, second and first work stations, respectively, and are undergoing the particular operations associated thereat as was previously described with respect to chamber 21.

Upon the completion of the next incremental rotation of member 2, chambers 21-26 are now concurrently in operative positions with the first, sixth, fifth, fourth, third and second work stations. As a result, chamber 21 is moved away from the sealed off region between channels 7 and 8 and is placed in atmospheric pressure via opening 15. Chamber 21 is thus ready to be loaded with the next substrate loaded tray to be tested and the aforedescribed cycle repeated. It should be again understood, chambers 22-26 are concurrently undergoing the particular operations at their last mentioned respective operative positions associated thereat as was previously described with respect to chamber 21. For further information and details to the assembly 20, its operation and the system in which it is utilized, reference may be made to my aforementioned copending application.

The gas bearing and seal apparatus of the present invention is particularly useful for a vacuum to vacuum entry system and is particularly useful for such systems when air is desired to be used as the gas, such as in the vacuum to vacuum entry system described in my aforementioned copending application. The parameters of one such combination gas bearing and seal apparatus using dry nitrogen as the bearing gas and designed in accordance with the principles of the present invention are indicated in Table I as follows:

TABLE I

| Spacing S | 0.00005 inches |
|---|---|
| Pressure-Opening 9 | 0.000001 Torr |
| Pressure-Openings 11 and 12 | 0.01 Torr |
| Pressure-Channels 7 and 8 | 0.01 Torr |
| Pressure-Opening 15 | 760 Torr |
| Pressure-Holes 40 and 50 | 40.0 psi |

The two bearing members of the design were made of aluminum and had cylindrical configurations of approximately nine inch diameters; and the bearing surfaces were hard anodized treated and lapped to a surface flatness of 0.00001 inches.

It should be understood that while the present invention is particularly useful for vacuum to vacuum entry systems, it may be also used to for other relatively higher pressure entry systems, as is apparent to those skilled in the art. Moreover, while in the preferred embodiment is symmetrically configured with respect to axis 3, it should be understood that the invention can be modified to include non-symmetrical configurations as long as the region to be sealed by the gas of the bearing does not encompass the axis 3 in accordance with the principles of the present invention. Also, while the gas bearing means providing the gas in the gap S and/or the gas sink means in the preferred embodiment are located on the member 1, one or both of the last mentioned means may be located on the member 2 as is also apparent to those skilled in the art. Furthermore, the present invention may be modified to be rotatable in the reverse direction and/or in a bidirectional manner. Also, it should be understood that other type bearing gasses besides air or nitrogen may be used such as, for example, other inert gasses. Furthermore, it should be understood as is apparent to those skilled in the art that the invention can be practiced with sectors greater or lesser than 180 degrees.

Thus, while the invention has been described with reference to preferred embodiments thereof, it will be understood by those skilled in the art that various changes in form and details may be made without departing from the scope of the invention.

I claim:

1. Gas bearing and seal apparatus comprising:
   a first member having a first planar gas bearing surface,
   a second member having a second planar gas bearing surface in parallel facing relationship with said first surface, said first and second surfaces being relatively rotatable with respect to each other about an axis normal to said first and second surfaces,
   said first surface having a predetermined region therein offset a predetermined radial distance from said axis and not intersected by said axis,
   gas supply means for providing a gas between said first and second surfaces to support axially said first and second members with a predetermined spacing between said surfaces, and
   gas sink means within a predetermined sector of said first surface relative to said axis, said region being disposed within said sector and said gas being sinked away from said region by said gas sink means,
   said gas between said first and second surfaces and said gas sink means coacting to provide a seal about said region, said axis being unsurrounded by said region and said seal.

2. Gas bearing and seal apparatus comprising:
   a first member having a first planar gas bearing surface,
   a second member having a second planar gas bearing surface in parallel facing relationship with said first surface, said first and second surfaces being relatively rotatable with respect to each other about an axis normal to said first and second surfaces,
   said first surface having a predetermined region therein offset a predetermined radial distance from said axis and not intersected by said axis,
   gas supply means for providing a gas between said first and second surfaces to support axially said first and second members with a predetermined spacing between said surfaces, and
   gas sink means within a predetermined sector of said first surface relative to said axis, said region being disposed within said sector and said gas being sinked away from said region by said gas sink means, said gas sink means having at least two gas sink parallel arcuate channels concentric with said axis and disposed within said sector and in said first surface, said region being disposed between said two channels, said gas between said first and second surfaces and said gas sink means coacting to provide a seal for said region.

3. Gas bearing and seal apparatus comprising:

a first member having a stationary first planar gas bearing surface, a second member having a second planar gas bearing surface in parallel facing relationship with said first surface, said second surface being incrementable rotatable with respect to said first surface about an axis normal to said first and second surfaces, said first surface having a predetermined region therein offset a predetermined radial distance from said axis and not intersected by said axis, gas supply means for providing a gas between said first and second surfaces to support axially said first and second members with a predetermined spacing between said surfaces, gas sink means within a predetermined sector of said first surface relative to said axis, said region being disposed within said sector and said gas being sinked away from said region by said gas sink means, said gas between said first and second surfaces and said gas sink means coacting to provide a seal for said region, and a vacuumized opening disposed within said region of said first surface, said gas being sinked away from said opening by said gas sink means, and wherein said seal seals said vacuumized opening.

4. Apparatus according to claim 3 further comprising:

at least one offset second opening disposed in said second surface at substantially the same radial distance from said axis as said predetermined radial distance of said region of said first member, said first and second openings being aligned for intercommunication therebetween by the incrementable rotation of said second surface, wherein said seal further seals said second opening whenever said second opening is aligned with said sector of said first member and seals said vacuumized and said second openings whenever the two said openings are aligned for said intercommunication.

5. Apparatus according to claim 4 wherein said gas sink means comprises:

at least two gas sink concentric arcuate channels within said sector and in said first surface, said opening of said first member being disposed between said two channels, and said second opening of said second member being aligned between said two channels whenever said second opening is rotated by said second member past said sector of said first surface.

6. Apparatus according to claim 5 wherein said second opening is vacuumized when in alignment with said first opening.

7. Apparatus according to claim 5 wherein said gas maintains said spacing between said gas bearing surfaces at substantially 0.00005 inches, the pressure of said gas is substantially 40 psi, said vacuumized opening is at a pressure of 0.000001 Torr, and said two gas sink channels are at 0.01 Torr.

8. Apparatus according to claim 3 further comprising:

means for pivoting said first member about said axis, and biasing means for biasing said first member towards said second member, said pivoting means and said biasing means coacting with said gas between said first and second surface to compensate for any skew in said parallel facing relationship.

9. Gas bearing and seal apparatus comprising:

a first member having a first planar gas thrust bearing circular surface, a second member having a second planar gas thrust bearing circular surface in parallel facing relationship with said first surface, said first and second surfaces being concentrically disposed about an axis normal to said first and second surfaces and being relatively rotatable with respect to each other about said axis, said first surface having a predetermined region therein offset a predetermined radial distance from said axis and not intersected by said axis, gas supply means for providing a gas between said first and second surfaces to support axially said first and second members with a predetermined spacing between said surfaces, and gas sink means within a predetermined sector of said first surface relative to said axis, said region being disposed within said sector and said gas being sinked away from said region by said gas sink means, said gas between said first and second surfaces and said gas sink means coacting to provide a seal about said region, said axis being unsurrounded by said region and said seal.

10. Gas bearing and seal apparatus comprising:

a first member having a first planar gas thrust bearing circular surface, a second member having a second planar gas thrust bearing circular surface in parallel facing relationship with said first surface, said first and second surfaces being concentrically disposed about an axis normal to said first and second surfaces and being relatively rotatable with respect to each other about said axis, said first surface having at predetermined region therein offset a predetermined radial distance from said axis and not intersected by said axis, gas supply means for providing a gas between said first and second surfaces to support axially said first and second members with a predetermined spacing between said surfaces, and gas sink means within a predetermined sector of said first surface relative to said axis, said region being disposed within said sector and said gas being sinked away from said region by said gas sink means, said gas sink means having at least two gas sink parallel arcuate channels concentric with said axis and disposed within said sector and in said first surface, said region being disposed between said two channels, said gas between said first and second surfaces and said gas sink means coacting to provide a seal for said region.

11. Gas bearing and seal apparatus comprising:

a first member having a stationary first planar gas thrust bearing circular surface, a second member having a second planar gas thrust bearing circular surface in parallel facing relationship with said first surface, said first and second surfaces being concentrically disposed about an axis normal to said first and second surfaces and said second surface being incrementable rotatable with respect to said first surface about said axis, said first surface having a predetermined region therein offset a predetermined radial distance from said axis and not intersected by said axis, gas supply means for providing a gas between said first and second surfaces to support axially said first and second members with a predetermined spacing between said surfaces, gas sink means within a predetermined sector of said first surface relative to said axis, said region being disposed within said sector and said gas being sinked away from said region by said gas sink means, and a vacuumized opening disposed within said region of said first surface, said gas between said first and second surfaces and said gas sink means coacting to provide a seal for said region, said gas being sinked away from said opening by said gas sink means, and wherein said seal seals said vacuumized opening.

12. Apparatus according to claim 11 further comprising:
at least one offset second opening disposed in said second surface at substantially the same radial distance from said axis as said predetermined radial distance of said region of said first member, said first and second openings being aligned for intercommunication therebetween by the incrementable rotation of said second surface,
wherein said seal further seals said second opening whenever said second opening is aligned with said sector of said first member and seals said vacuumized and said second openings whenever the two said openings are aligned for said intercommunication.

13. Apparatus according to claim 12 wherein said gas sink means comprises:
at least two gas sink concentric arcuate channels within said sector and in said first surface, said opening of said first member being disposed between said two channels, and said second opening of said second member being aligned between said two channels whenever said second opening is rotated by said second member past said sector of said first surface.

14. Apparatus according to claim 13 wherein said second opening is vacuumized when in alignment with said first opening.

15. Apparatus according to claim 13 wherein said gas is nitrogen and said gas maintains said spacing at substantially 0.00005 inches, the pressure of said gas is substantially 40 psi, said vacuumized opening is at a pressure of 0.000001 Torr, and said two gas sink channels are at 0.01 Torr.

16. Apparatus according to claim 11 further comprising:
means for pivoting said first member about said axis, and
biasing means for biasing said first member towards said second member,
said pivoting means and said biasing means coacting with said gas between said first and second surfaces to compensate for any skew in said parallel facing relationship.

* * * * *